United States Patent

Lubowitz et al.

[11] Patent Number: 5,968,640
[45] Date of Patent: Oct. 19, 1999

[54] CONDUCTIVE, THERMALLY STABLE OLIGOMERS

[75] Inventors: Hyman R. Lubowitz, Rolling Hills Estates, Calif.; Clyde H. Sheppard, Bellevue; Larry P. Torre, Renton, both of Wash.

[73] Assignee: The Boeing Company, Seattle, Wash.

[21] Appl. No.: 06/773,381

[22] Filed: Sep. 5, 1985

Related U.S. Application Data

[63] Continuation-in-part of application No. 06/726,258, Apr. 23, 1985, abandoned, and a continuation-in-part of application No. 06/726,259, Apr. 23, 1985, abandoned.

[51] Int. Cl.⁶ .................................................. B32B 7/00
[52] U.S. Cl. ........................ 428/245; 428/294; 428/408; 428/902; 526/285; 526/259; 526/262; 528/170; 528/171; 528/172; 528/174; 528/183; 528/185; 528/229; 528/316; 548/521; 548/547; 548/549; 548/431
[58] Field of Search ................................. 526/259, 262, 526/285; 528/170–174, 183, 185, 229, 316; 548/546–549, 521, 431; 428/245, 294, 408, 902

[56] References Cited

U.S. PATENT DOCUMENTS

| 3,966,678 | 6/1976 | Gruffaz et al. | 260/47 UA |
|---|---|---|---|
| 4,251,417 | 2/1981 | Chow et al. | 260/30.2 |
| 4,251,418 | 2/1981 | Chow et al. | 260/30.2 |
| 4,251,420 | 2/1981 | Antonoplos et al. | 260/30.2 |

FOREIGN PATENT DOCUMENTS

| 0067976 | 12/1982 | European Pat. Off. . |
|---|---|---|
| 0148534 | 7/1985 | European Pat. Off. . |

OTHER PUBLICATIONS

Lubowitz et al., *Chem Abs.*, 105, Abs. #61322 q (Aug. 1986).

*Primary Examiner*—Edward A. Miller
*Attorney, Agent, or Firm*—John C. Hammar

[57] ABSTRACT

The morphology of multidimensional, thermally stable oligomers is combined with the inclusion of charge carrier linkages within the polymer arms to produce thermally stable advanced composites from cured oligomers that are conductive or semiconductive if suitably doped.

21 Claims, No Drawings

CONDUCTIVE, THERMALLY STABLE OLIGOMERS

REFERENCE TO RELATED APPLICATIONS

This application is a continuation-in-part application based upon U.S. application Ser. No. 06/726,258, filed Apr. 23, 1985 (incorporated by reference), and U.S. application Ser. No. 06/726,259, filed Apr. 23, 1985 (incorporated by reference), both now abandoned.

TECHNICAL FIELD

The present invention relates to a family of thermally stable oligomers that are conductive or semiconductive when suitably doped. Aromatic polymeric arms containing conductive linkages project from a central aromatic hub and end with crosslinking end groups. When the oligomer is cured, three-dimensional polymeric matrices are formed with controlled crosslinking to achieve high performance composites.

BACKGROUND ART

While epoxy-based composites are suitable for many applications, their brittle nature and susceptibility to degradation make them inadequate for many aerospace applications, especially those applications which require thermally stable, tough composites. Accordingly, research has recently focused upon polyimide composites to achieve an acceptable balance between thermal stability, solvent resistance, and toughness. Still the maximum temperatures for use of the polyimide composites, such as PMR-15, are about 600–625° F., since they have glass transition temperatures of about 690 ° F.

Polybenzoxazoles, such as those disclosed in copending U.S. application Ser. No. 651,862, may be used at temperatures up to about 750–775° F., since these composites have glass transition temperatures of about 840° F. Aerospace applications need composites which have even higher use temperatures while maintaining toughness, solvent resistance, processibility, formability, strength, and impact resistance.

Chemists have sought to synthesize these new oligomers for high performance advanced composites, resulting in a progression of compounds synthesized to provide unique properties or combinations of properties. For example, Kwiatkowski and Brode disclosed maleic capped linear polyarylimides in U.S. Pat. No. 3,839,287. Holub and Evans disclosed maleic or nadic capped imido-substituted polyester compositions in U.S. Pat. No. 3,729,446. Lubowitz and Sheppard disclosed thermally stable polysulfone oligomers in U.S. Pat. No. 4,476,184, and have continued to make advances with polyetherimidesulfones, polybenzoxzolesulfones, and polybutadienesulfones. "Star" and "star-burst" multidimensional oligomers exhibit surprisingly high glass transition temperatures, as described in copending U.S. application Ser. No. 726,258. The multidimensional oligomers have superior processibility than some advanced composite oligomers since they can be handled at lower temperatures. Upon curing, however, the thermal resistance of the resulting composite is markedly increased with only a minor loss of stiffness, matrix stress transfer (impact resistance), toughness, elasticity, and other mechanical properties.

While polyesters are among the most highly developed polymers, commercial polyesters do not exhibit satisfactory thermal and oxidative resistance to be useful for aircraft or aerospace applications. Even polyarylesters are unsatisfactory, since the resins are generally insoluble in laminating solvents, are intractable in fusion, and shrink or warp during composite fabrication. The high concentration of ester groups contributes to resin strength and tenacity, but also makes the resin susceptable to the damaging effects of water absorption. High moisture absorption can lead to distortion of the composite when it is loaded at elevated temperature.

Conductive and semiconductive plastics have been extensively studied (see, e.g., U.S. Pat. Nos. 4,375,427; 4,338,222; 3,966,987; 4,344,869; and 4,344,870). These prior art polymers do not possess the blend of properties which are essential for aerospace applications. That is, the conductive polymers do not possess the blend of (1) toughness (2) stiffness, (3) elasticity, (4) processibility, (5) impact resistance and other matrix stress transfer capabilities, (6) retention of properties over a broad range of temperatures, and (7) high temperature resistance which is desirable on aerospace advanced composites. The prior art composites are often too brittle.

As described in copending U.S. application Ser. No. 726,259, high performance, aerospace advanced composites can be prepared using crosslinkable, end capped polyester imide ether sulfone oligomers that have the desired combined properties of solvent resistance, toughness, impact resistance, strength, processibility, formability, and thermal resistance. By including Schiff base (-CH=N-), imidazole, thiazole, or oxazole linkages in the oligomer chain, the linear, advanced composites formed with oligomers of U.S. application Ser. No. 726,259 can have semiconductive or conductive properties when appropriately doped.

As described in copending U.S. application Ser. No. 726,258, glass transition temperatures above 900° F. are achievable with multidimensional, branched oligomers which include crosslinking groups at the ends of linear aromatic "sulfone" arms radiating from an aromatic hub. When cured to crosslink the end caps, these "star" and "star-burst" oligomers provide a multidimensional array. The resulting thermally stable composite exhibits excellent toughness and processibility. The crosslinking groups (usually nadic and acetylenic phenylimide moieties) also provide solvent resistance to the composites. Glass transition temperatures of about 950° F. or higher are achievable.

The present invention combines features of the "Schiff base" conductive sulfone polyarylesters with the "star" and "star-burst" multidimensional morphology to create advanced conductive composites.

SUMMARY OF THE INVENTION

The commercially available conductive or semiconductive polymers that are usually intractable and infusible. They also degrade at temperatures above about 100° C., and, accordingly, are unsatisfactory for aerospace applications. Linear "Schiff base" polyesters, such as those described in U.S. application Ser. No. 726,259, may have poor solubility and poor melt-flow characteristics, which make them difficult to process into composites. Therefore, the present invention combines (1) the morphology behind the thermally stable, "star" or "star-burst" oligomers of U.S. application Ser. No. 726,258 with (2) relatively short polymeric arms of polyester or polyether "Schiff base" compounds and with (3) crosslinking end caps to provide, upon doping, conductive or semiconductive oligomers with high use temperatures.

These preferred compounds generally are made by reacting an aromatic hub, such as a compound of the general formula:

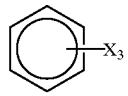

with a corresponding mono- or difunctional crosslinkable end cap of the general formula:

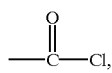

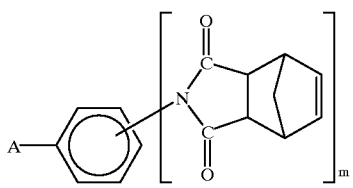

wherein A=X as defined for the hub, provided that if X=-CHO,

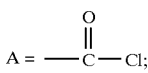

and $m=1$ or 2, and with the appropriate mixtures of diamines, aldehydes, and phenols to achieve "Schiff base" arms radiating from the hub.

Preferred products have the general formula:

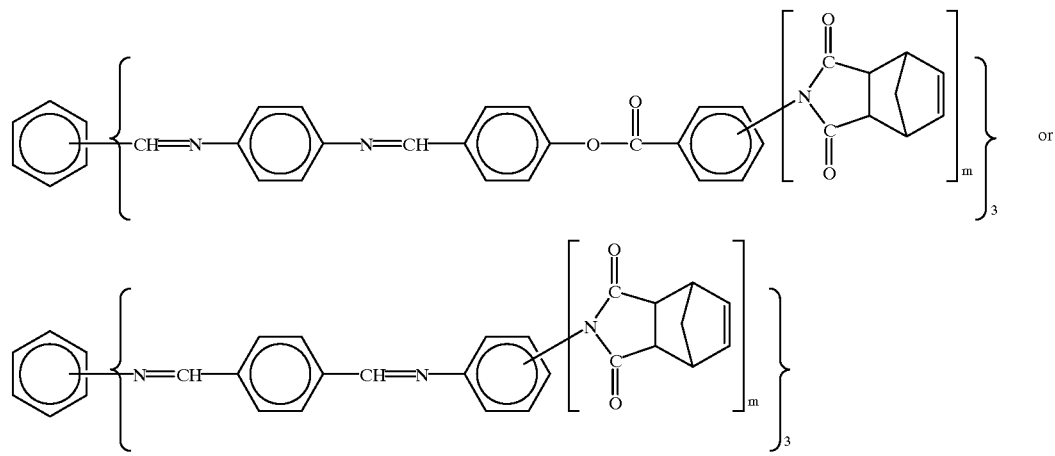

of course, oligomers with more arms or longer arms might also be made.

BEST MODE CONTEMPLATED FOR THE INVENTION

Thermally stable oligomers having semiconductive or conductive properties when doped with suitable dopants have the multidimensional oligomer morphology described in U.S. application Ser. No. 726,528. The linear arms of the oligomers contain Schiff base linkages (or other conductive linkages) between aromatic groups. Sulfone and ether linkages may be interspersed in the arms, as will be explained. Each arm is terminated with a mono- or difunctional end cap to allow controlled crosslinking upon heat-induced or chemically-induced curing. The resulting oligomers and composites are conductive, thermally stable compounds suitable for many aerospace applications. For example,

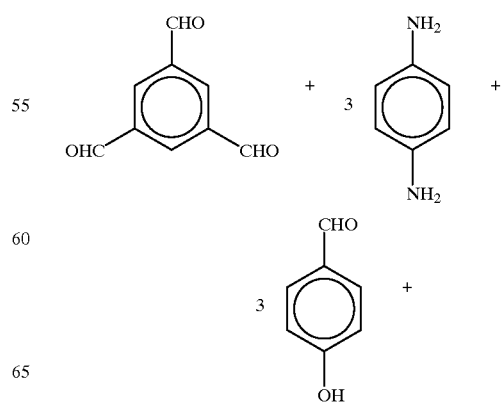

-continued

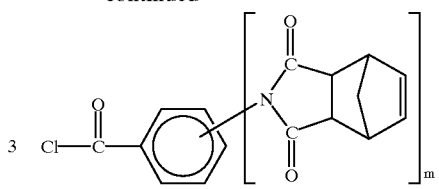

can be mixed and reacted under an inert atmosphere to yield:

wherein m=1 or 2

In general terms, the invention relates to a process and the products of the process for making "star" (m=1) or "starburst" (m=2) multidimensional oligomers of this general type.

Thermally stable oligomers suitable for high temperature advanced composites are synthesized to include a high degree of aromatic groups. The stable aromatic bond energies allow synthesis of an oligomer with outstanding thermal stability. Acceptable toughness and impact resistance is gained through electronegative linkages within the linear

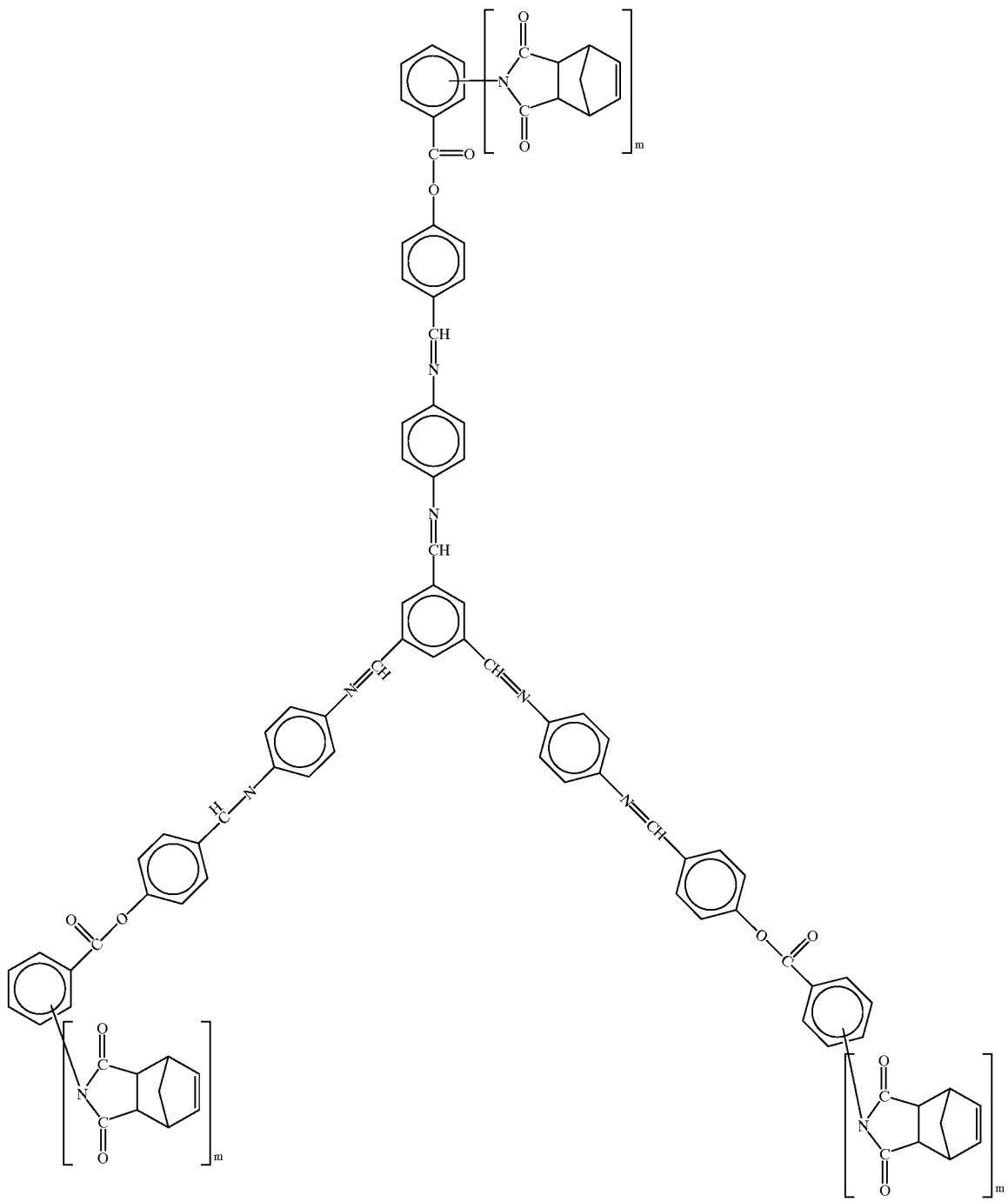

chains of aromatic groups that radiate from the central aromatic hub. The electronegative linkages are generically called "sulfone" linkages for purposes of this description, and include the groups:

-CO-;
-SO$_2$-;
-(CF$_3$)$_2$C-; and
-S-.

Generally, -CO- and -SO$_2$- groups are preferred for cost, convenience, and performance. The group -S—S- should be avoided, since it is too thermally labile.

The preferred aromatic moieties are aryl groups, such as phenyl, biphenyl and naphthyl. Other aromatic groups can be used, if desired, since their stablized aromatic bonds should provide the desired thermal stability. For example, azaline groups may be used. The aryl groups may include substituents, if desired, such as halogen, lower alkyl up to about 4 carbon atoms, lower alkoxy up to about 4 carbon atoms, or aryl side chains. Steric hindrance may arise in synthesizing the oligomers or in crosslinking the oligomers into the final composites, if the side chains are too large. The substituents may also effect the thermal stability of the resulting oligomers and composites. Unsubstituted phenyl groups are preferred for cost, convenience, and performance.

Improved performance and thermal stability is gained through the creation of a multidimensional, crosslinked polymer. An aromatic hub includes a plurality of rays or spokes radiating from the hub in the nature of a star to provide multidimensional crosslinking with a greater number of crosslinking bonds than linear arrays alone through suitable terminal groups. Usually the hub will have three radiating chains to form a Y pattern. In some cases, four chains may be used. Including more chains leads to steric hindrance as the hub is too small to accommodate the radiating chains. A trisubstituted phenyl hub is highly preferred with the chains being symmetrically placed about the hub. Biphenyl, naphthyl, or azaline may also be used as the hub along with other aromatic moieties, if desired.

The chains include crosslinking end groups, which improve the solvent-resistance of the polymers and advanced composites, and which further stabilize the polymer. These end groups may be thermally or chemically activated during the curing step to provide a strongly crosslinked, complex, multidimensional array of interconnected oligomers. When the goal is an advanced composite having a glass transition temperature above 900° F. (and preferably above 950° F.) each end cap should have high thermal stability and a high thermal activation temperature. End caps with two crosslinking functionalities (difunctional end caps) are expected to yield the highest crosslinked arrays.

Although the para isomer is illustrated, other isomers may be used. The highest thermal stabilities appear to be achievable with unsubstituted phenyl chains of short length when these chains are capped with difunctional end caps.

Each arm of the oligomer includes a conductive linkage, such as a Schiff base (-CH=N-) linkage, and chain extender portions such as the single benzene groups illustrated in the example. By the proper combination of aldehydes, amines, alcohols (phenols), and acid chlorides, a family of oligomers can be made.

The oligomers may be formed by the attachment of arms to the hub followed by chain termination in two steps. For example, tribromobenzene may be mixed with p-aminophenol and 4,4'-dibromodiphenylsulfone and reacted under an inert atmosphere at an elevated temperature to achieve an amino terminated "star" of the general formula:

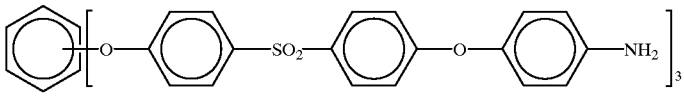

which can be reacted with suitable aldehydes, phenols, and end caps to yield a suitable end capped oligomer. Those skilled in the art will recognize the generality of this synthetic pathway to achieve "stars" with extended conductive arms including phenoxyphenyl sulfone linkages interspersed with the conductive linkages, The oligomers can be synthesized in a homogeneous reaction scheme wherein all the reactants are mixed at one time, or in a stepwise reaction scheme wherein the radiating chains are affixed to the hub and the product of the first reaction is subsequently reacted with the end cap groups. Of course, the hub may be reacted with end-capped arms that include one reactive, terminal functionality for linking the arm to the hub. Homogeneous reaction is preferred, resulting undoubtedly in a mixture of oligomers because of the complexity of the reactions. The products of the processes (even without distillation or isolation of individual species) are preferred oligomer mixtures which can be used without further separation to form the desired advanced composites.

Oligomers can be synthesized from a mixture of four or more reactants so that extended chains may be formed. Adding components, however, adds to the complexity of the reaction and of its control. Undesirable competitive reactions may result or complex mixtures of macromolecules having widely different properties may be formed, because chain extenders and chain terminators are mixed, and compete against one another.

The selection of arms and end caps can effect the thermal stability, toughness, processibility, impact resistance, and solvent resistance of the resulting oligomers and advanced composites formed with the cured oligomers. Longer arms may result in reduced thermal stability since the relative proportion of crosslinking bonds will be reduced, and the crosslinking bonds will be spaced farther apart. Since the end caps exhibit different thermal properties, they will undoubtedly impart different properties to the resulting composite. Although the goal is advanced composites with thermal stabilities above 900° F., a wide variety of composites with different use ranges can be made, and are all considered to be within the class of compounds contemplated by this invention. To that end, the end caps may be selected from the group consisting of:

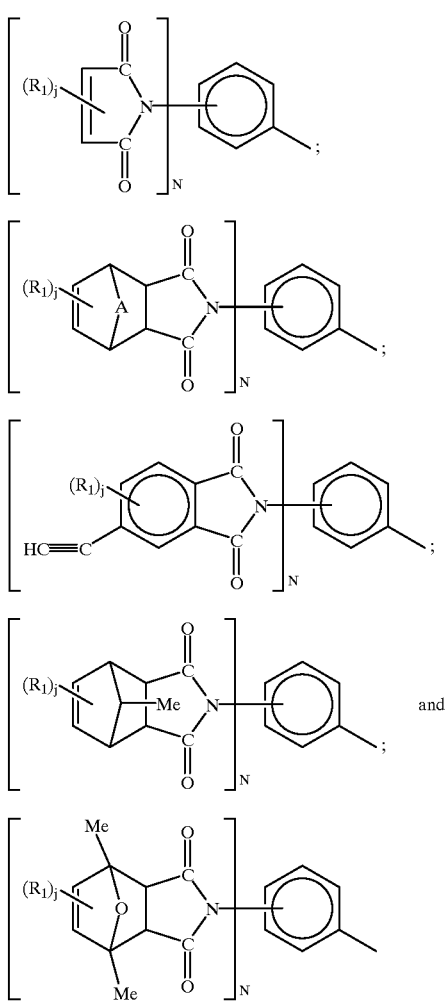

wherein n=1 or 2;

$R_1$=lower alkyl, lower alkoxy, aryl, and substituted aryl (preferably H- or $CH_3$-);

A=-$CH_2$-, -S-, -O-, or -$SO_2$ (preferably -$CH_2$-); and j=0, 1, or 2. Maleic, dimethyl oxynadic, ethynyl, trimethylsilylethynyl, and phenylethynyl end groups may also be used, if desired. These end caps will probably allow curing at lower temperatures, and will probably produced composites of lower thermal stability.

To obtain the highest thermal stability in the oligomers and advanced composites, the preferred end caps are:

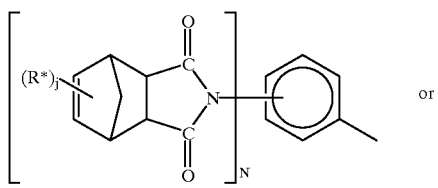

-continued

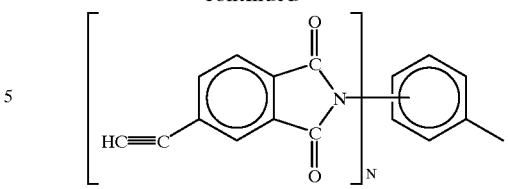

wherein R*=$CH_3$-; n=1 or 2 (preferably 2); and j=0, 1, or 2.

Although aryl backbones for the chains are preferred, aliphatic moieties, such as MCTC, may be incorporated into the arms if desired. Aliphatic moieties probably will reduce the thermal stability of the resulting composites since aliphatic bonds are less stable than aromatic bonds.

For purposes of this description, "sulfone" is generally used in a generic way to include -$SO_2$- (sulfone), -CO- (carbonyl), -$(CF_3)_2$C-(hexafluoroisopropanyl), or -S- (sulfide). Thus, for example, the -$SO_2$ linkage of the amino terminated "star" can have any of the identified, electronegative linkages substituted for it in the family of oligomers contemplated by this invention.

"Schiff base" is also generally used in a generic way to represent conductive linkages such as -CH=N-, oxazoles, thiozoles, or imidazoles.

Dopants for creating semiconductive or conductive composites are preferably selected from compounds commonly used to dope other polymers, namely (1) dispersions of alkali metals (for high activity) or (2) strong chemical oxidizers, particularly alkali perchlorates (for lower activity). Arsenic compounds and elemental halogens, while active dopants, are too dangerous for general usage, and are not recommended.

The dopants react with the polymers to form charge transfer complexes. N-type semiconductors result from doping with alkali metal dispersions. P-type semiconductive result from doping with elemental iodine or perchlorates.

While research into conductive or semiconductive polymers has been intense, the resulting compounds (mainly polyacetylenes, polyphenylenes, and polyvinylacetylenes) are unsatisfactory for aerospace applications because the polymers are:

(a) unstable in air;
(b) unstable at high temperatures;
(c) brittle after doping;
(d) toxic because of the dopants; or
(e) intractable.

These problems are overcome or significantly reduced with the conductive oligomers of the present invention.

The polymers of the present invention generally exhibit greater oxidative stability and greater dimensional stability at elevated temperatures, greater impact strengths, greater dimensional stiffness over a wider range of temperatures, and greater toughness than prior art conductive oligomers and composites.

While conventional theory holds that semiconductive polymers should have (1) low ionization potentials, (2) long conjugation lengths, and (3) planar backbones, there is an inherent trade-off between conductivity and toughness or processibility, if these constraints are followed. To overcome the processing and toughness shortcomings common with Schiff base, oxazole, imidazole, or thiazole polymers, the oligomers of the present invention, include "sulfone" linkages interspersed along the backbone providing a mechanical swivel for the rigid, conductive segments of the arms. Phenoxyphenylsulfone or phenoxyphenylketone moieties are preferred. The resulting compounds are polyphenoxyphenylsulfoneimido polymers with conductive segments.

Preferred Schiff base segments for the arms have the general formula:

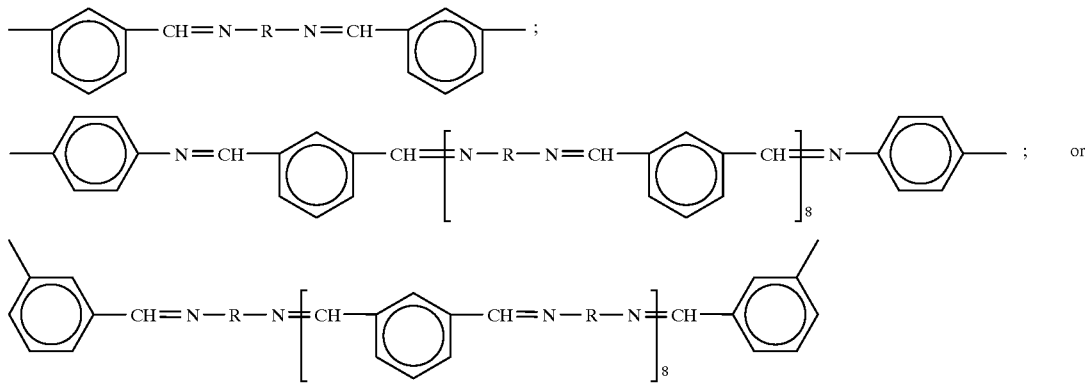

wherein R=an aromatic moiety or a short aryl chain including a
plurality of aryl moieties linked with any of -$CH_2$-, -$SO_2$-, -S-, -O-, -CO-, -$(CH_3)_2$C-, or -$(CF_3)_2$C-
and q=0–4.

R is generally selected from the group consisting of:
  phenyl;
  biphenyl;
  naphthyl; or
  a compound of the general formula:

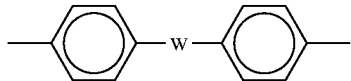

wherein W=-$CH_2$- or -$SO_2$. Similar segments including oxazole

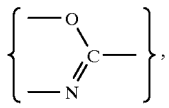

thiazole

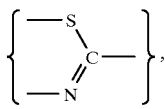

or imidazole

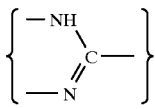

linkages instead of (-CH=N-) linkages can also be used. Benzoxazoles, benzothiazoles, and benzimidazoles may be used as "Schiff base" linkages.

Because it may be difficult to make precursor molecules having intermediate benzimidazole, benzoxazole, or benzothiazole linkages, and because the chemistry for Schiff base (-CH=N-) compounds is well understood, it is preferred to use Schiff base segments in the oligomers for semiconductive or conductive applications.

Solubility of the oligomers becomes an increasing problem as the length of the chains increases. Therefore, shorter chains are preferred, if the resulting oligomers remain processible. That is, the chains should be long enough to yield thermoplastic characteristics but short enough to keep the oligomers soluble during the reaction sequence.

The reactive aldehydes, diamines, alcohols (phenols), or acid halides may have backbones of the following general nature and may be combined in many ways to form oligomers of the general class of interest.

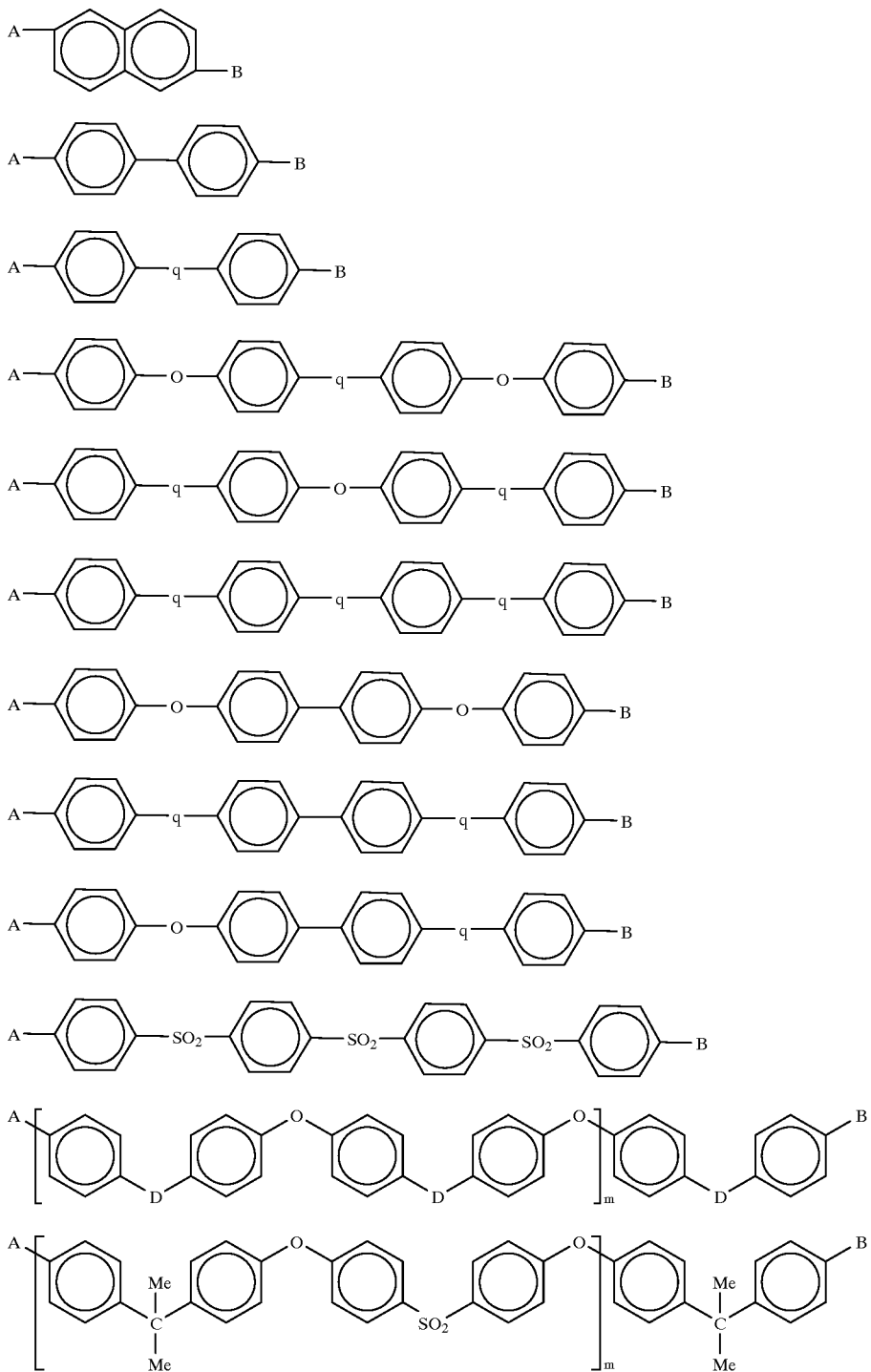
wherein q=-SO$_2$-, -CO-, -S-, or -(CF$_3$)$_2$C-, and preferably -SO$_2$- or -CO-;
Me=CH3-;
m=an integer, generally less than 5, and preferably 0 or 1;
D any of -CO-, -SO$_2$-, or -(CF$_3$)$_2$C-;
A=-CHO, -NH$_2$, -OH, or
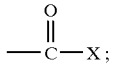

B=-CHO, -NH$_2$, -OH, or

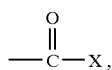

such that if A=-OH, B=-CHO, and that if B=-OH, A=-CHO; and

X=halogen.

EXAMPLE 1

A preferred oligomer is prepared by reacting:

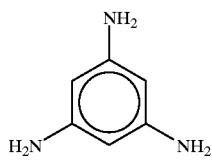 +

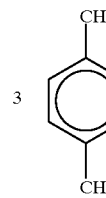 +

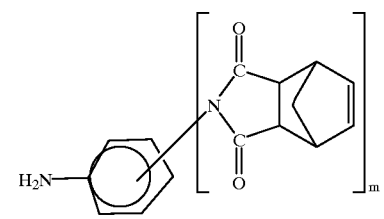

under an inert atmosphere to yield:

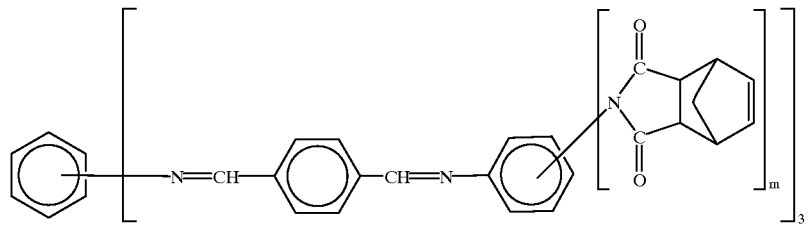

Oligomers of this general type are preferred because the starting materials are easily obtained and are inexpensive.

EXAMPLE 2

Another preferred oligomer is prepared by reacting:

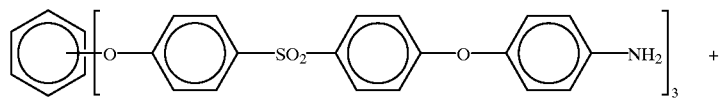

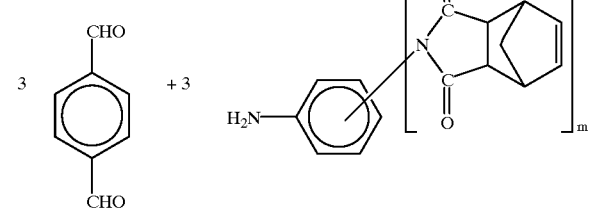

under an inert atmosphere to yield:

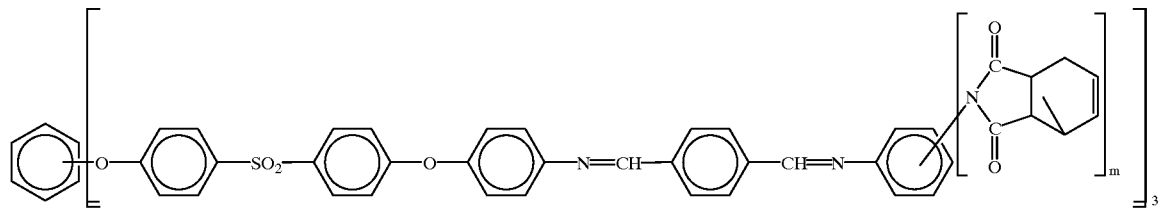
EXAMPLE 3
Another preferred oligomer is prepared by reacting:
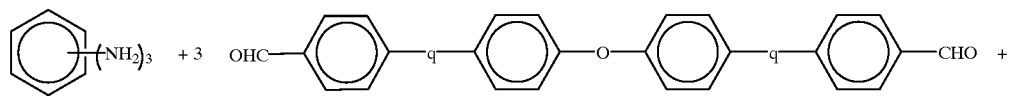
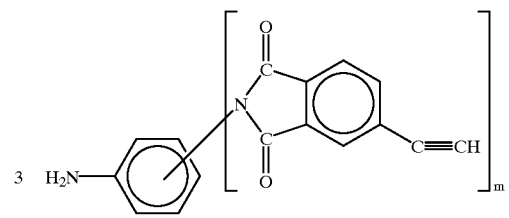
under an inert atmosphere to yield:
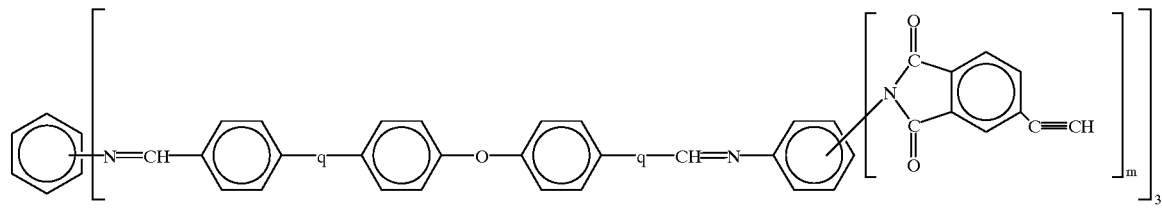
wherein q=-$SO_2$-, -CO-, -S-, or -($CF_3$)$_2$C-, and preferably -$SO_2$- or -CO-
EXAMPLE 4
Another preferred oligomer is prepared by reacting:
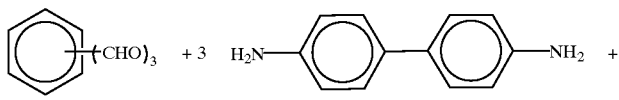
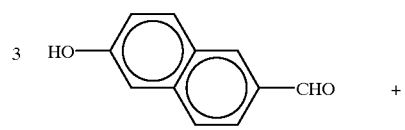

3 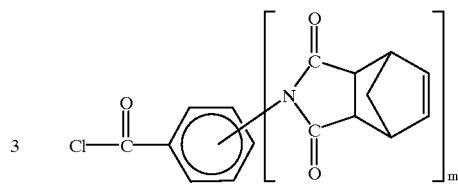
under an inert atmosphere to yield:
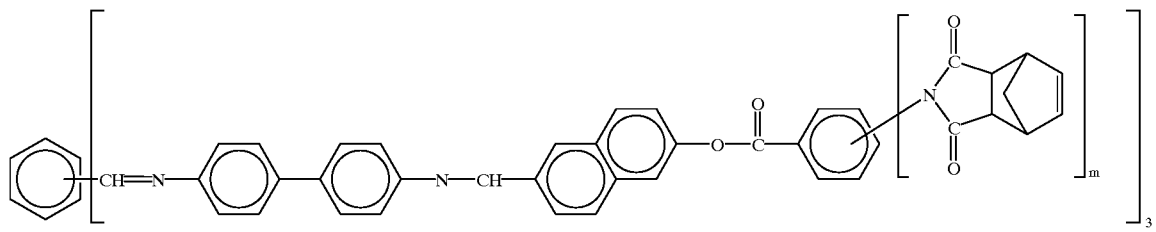
EXAMPLE 5
Yet another preferred oligomer is prepared by reacting:
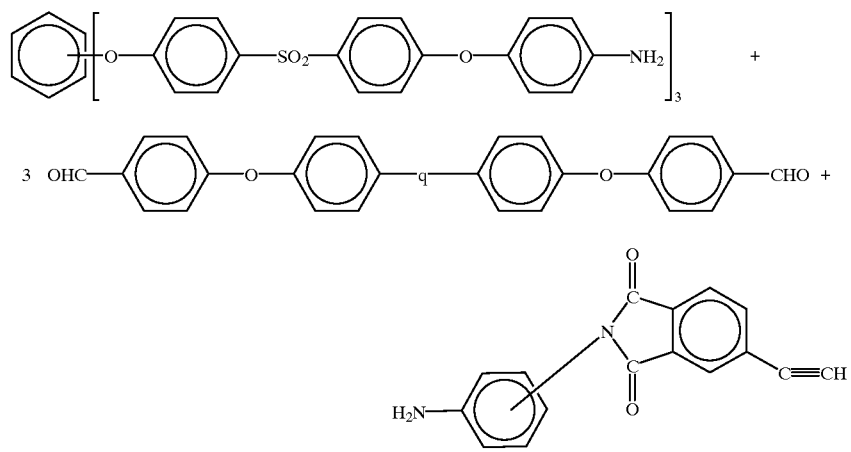
under an inert atmosphere to yield:
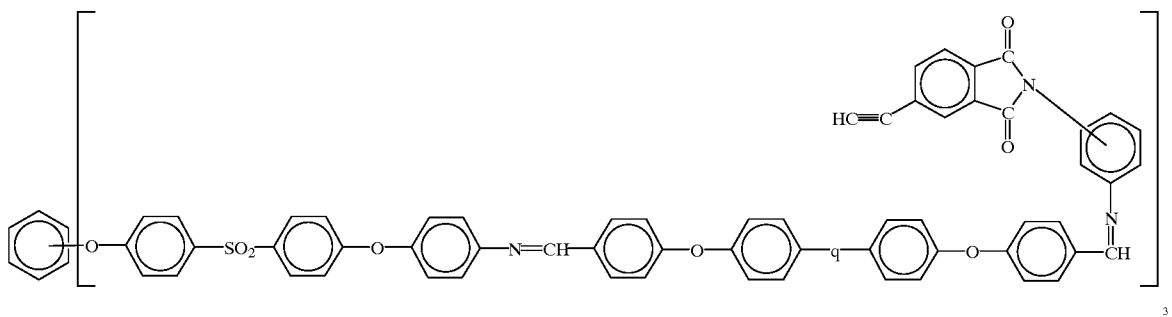
wherein q=-$SO_2$-, -CO-, -S-, or -($CF_3$)$_2$C-, and preferably -$SO_2$- or -CO-.

From these hypothetical examples, those skilled in the art will recognize the generality of the synthesis and will recognize the family of oligomers contemplated by the invention.

While the arms should be polyaryl, linear chains to obtain the highest thermal stability, such stability is only required for certain aerospace applications of composites formed with the oligomers. Accordingly, the invention also contemplates a family of semiconductive or conductive oligomers of lower thermal stability where, the arms may include saturated or unsaturated aliphatic groups, such as MCTC, between the conductive linkages. Because aliphatic bonds have lower bond emergies than aromatic bonds, oligomers of this general type are likely to have lower thermal stability. Use of only aromatic groups between linkages is preferred.

Prepregs and advanced composites can be readily prepared from the oligomers by conventional techniques. For example, the oligomers can be applied to a fiber cloth reinforcement, and the resulting prepreg can be cured in a vacuum bag process at an elevated temperature. The dopant should be added to the oligomer prior to prepreging.

While preferred embodiments have been described, those skilled in the art will readily recognize alterations, variations, and modifications which might be made without departing from the inventive concept. Therefore, the claims should be interpreted liberally with the support of the full range of equivalents known to those of ordinary skill based upon this description. The examples are given to illustrate the invention and not to limit it. The claims should be limited only as is necessary in view of the pertinent prior art.

We claim:

1. A solvent-resistant oligomer that is conductive or semiconductive when suitably doped with a conventional dopant, comprising an aromatic hub having at least three arms radiating from the hub, each arm being essentially a polyaryl chain including at least two conductive Schiff base (-CH=N-) linkages and including a terminal crosslinking residue selected from the group consisting of:

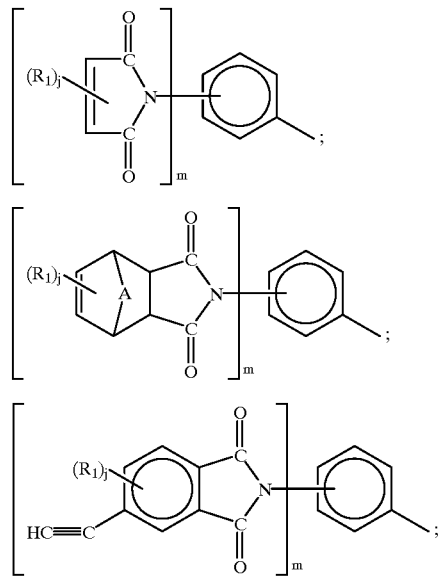

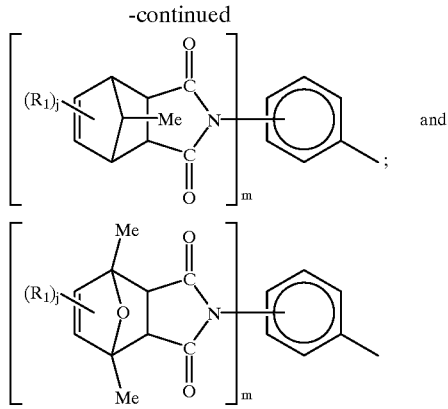

wherein m=1 or 2;
$R_1$=lower alkyl, lower alkoxy, aryl, and substituted aryl;
A=-$CH_2$-, -S-, -O-, or -$SO_2$-; and
j=0, 1, or 2;
the oligomer being the product of the process of the simultaneous condensation under an inert atmosphere of a polyfunctional hub having reactive amine or aldehyde functionalities, a polyaryl diamine or dialdehyde selected to react with the hub to form a Schiff base, and a suitable imidophenyl end cap monomer that includes the crosslinking residue.

2. The oligomer of claim 1 wherein the crosslinking residue is selected from the group consisting of:

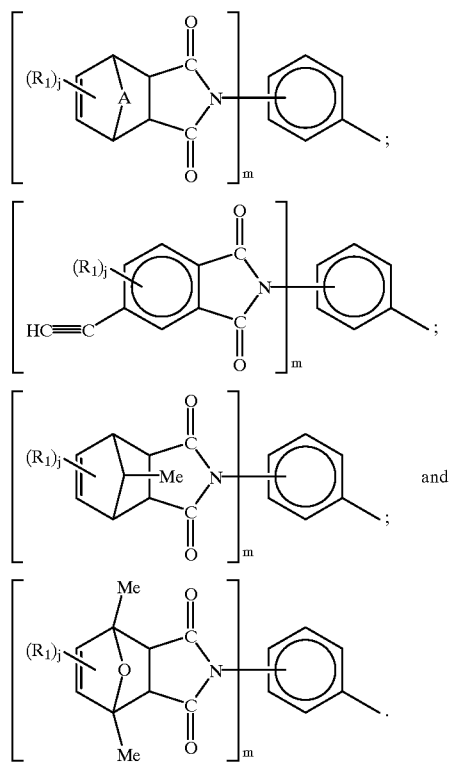

3. The oligomer of claim 1 wherein the hub is selected from the group consisting of phenyl, naphthyl, biphenyl, and azalinyl.

4. The oligomer of claim 2 wherein the hub is selected from the group consisting of phenyl, naphthyl, biphenyl, and azalinyl.

5. The oligomer of claim 1 wherein the hub is phenyl.

6. The oligomer of claim 2 wherein the hub is phenyl.

7. The oligomer of claim 1 wherein the oligomer has three arms.

8. The oligomer of claim 1 wherein the end cap is selected from the group consisting of:

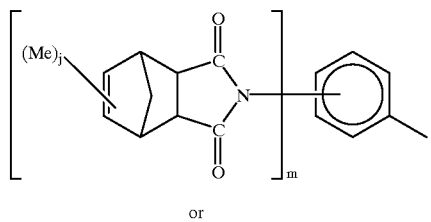

or

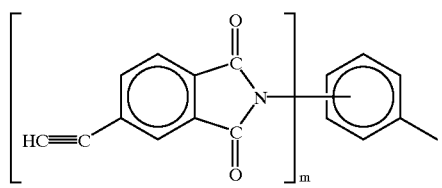

wherein Me=$CH_3$-; $m$=1 or 2; and j=0, 1, or 2.

9. The oligomer of claim 7 having a structural formula is selected from the group consisting of:

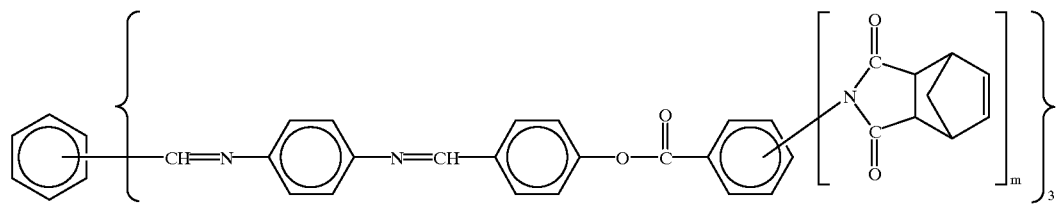

or

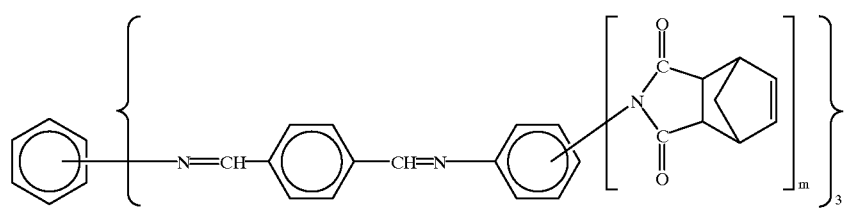

wherein m=1 or 2.

10. A composite comprising the oligomer of claim 1 and suitable fiber reinforcement.

11. The composite of claim 10 further comprising an effective amount of a dopant in the oligomer, the dopant being selected from the group consisting of alkali metals, alkali perchlorates, arsenic compounds, elemental halogens, and mixtures thereof.

12. The composite of claim 11 wherein the fiber reinforcement is a fiber cloth.

13. The oligomer of claim 9 a suitable fiber reinforcement.

14. The oligomer of claim 13 further comprising an effective amount of a dopant in the oligomer to make the oligomer conductive or semiconductive.

15. A composite formed by curing the oligomer of claim 14 at an elevated temperature in a conventional vacuum bag curing process.

16. An oligomer that is conductive or semiconductive when suitably doped with a conventional dopant, comprising the product of the process of reacting an aryl compound having three amine functionalities with an aryl or polyaryl moiety having a formula weight less than about 1000 having two aldehyde functionalities and with an amine, crosslinking end cap phenylimide.

17. An oligomer having the structural formula:

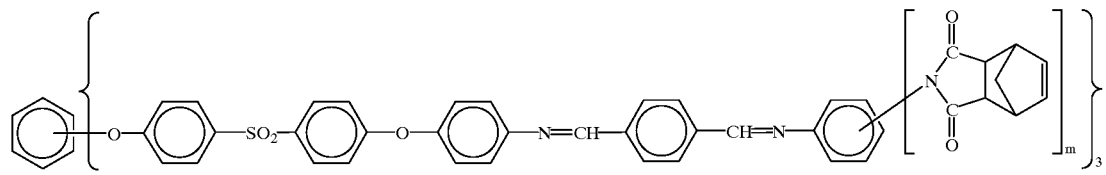

wherein m=1 or 2.

18. The oligomer of claim 17 wherein m=2.

19. A prepreg comprising the oligomer of claim 17 and a suitable fiber reinforcement.

20. A composite comprising the cured prepreg of claim 19.

21. The oligomer of claim 17 further comprising an effective amount of a dopant sufficient for making the resulting material at least semiconductive.

* * * * *